United States Patent
Kresse et al.

(10) Patent No.: US 6,308,124 B1
(45) Date of Patent: Oct. 23, 2001

(54) SYSTEM FOR DETERMINING AN EQUIVALENT THROTTLE VALVE FOR CONTROLLING AUTOMATIC TRANSMISSION SHIFT POINTS

(75) Inventors: John P. Kresse, Shelbyville; Stephen West, Greenwood, both of IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/193,057

(22) Filed: Nov. 16, 1998

(51) Int. Cl.[7] .............. F16H 61/02; F02D 41/00
(52) U.S. Cl. .............. 701/53; 701/93; 701/114; 701/94; 701/86; 123/333; 180/167; 192/216
(58) Field of Search .............. 701/53; 180/175, 180/177; 123/361; 477/408

(56) References Cited

U.S. PATENT DOCUMENTS

| | | |
|---|---|---|
| 4,646,697 | 3/1987 | Grob et al. . |
| 4,969,439 | 11/1990 | Scotson . |
| 4,972,919 * | 11/1990 | Ogawa ................... 180/179 |
| 4,984,546 | 1/1991 | Shimomura et al. . |
| 5,002,028 * | 3/1991 | Arai et al. ............... 123/399 |
| 5,058,552 | 10/1991 | Shimomura et al. . |
| 5,063,510 | 11/1991 | Jurgens et al. . |
| 5,086,740 * | 2/1992 | Wiggins et al. ............ 123/361 |
| 5,119,899 * | 6/1992 | Johnson et al. ............ 180/177 |
| 5,157,613 | 10/1992 | Williams et al. . |
| 5,226,351 | 7/1993 | Matsuoka et al. . |
| 5,230,256 | 7/1993 | Oizumi et al. . |
| 5,238,080 * | 8/1993 | Fastie .................... 180/178 |
| 5,455,767 | 10/1995 | Staerker . |
| 5,478,293 | 12/1995 | Yonezawa . |
| 5,507,705 * | 4/1996 | Hara ..................... 477/408 |
| 5,521,819 | 5/1996 | Greenwood . |
| 5,623,906 | 4/1997 | Storhok . |
| 5,638,790 | 6/1997 | Minowa et al. . |
| 5,665,026 * | 9/1997 | Linden ................... 477/108 |
| 5,711,712 | 1/1998 | Graf . |
| 5,778,329 | 7/1998 | Officer et al. . |
| 5,961,566 * | 10/1999 | Heslop ................... 701/93 |
| 6,021,370 * | 2/2000 | Bellinger et al. ........... 701/110 |
| 6,076,504 * | 6/2000 | Stavnheim ................ 123/447 |
| 6,134,499 * | 10/2000 | Goode et al. .............. 701/93 |

* cited by examiner

Primary Examiner—Tan Nguyen
Assistant Examiner—Tuan C To
(74) Attorney, Agent, or Firm—Barnes & Thornburg

(57) ABSTRACT

A system is disclosed for determining an effective throttle value of an internal combustion engine for controlling automatic transmission shift points. In one embodiment, the system is operable to determine an effective throttle value as a function of commanded fueling and engine speed under operating conditions wherein engine torque is requested by a system/component other than manual throttle control to thereby provide a throttle value indicative of what throttle position or percentage would be under present operating conditions if engine torque was being requested via manual throttle control. The present invention accordingly overcomes deficiencies in known automatic transmission shift point control systems by continuously computing an equivalent throttle percentage whenever fueling or requested torque values are not dominated by actual throttle (e.g. accelerator pedal) percentage. The equivalent throttle parameter value is approximately what the throttle percentage would be if manual throttle percentage was the dominant source of requested torque. Transmission shift point logic may resultantly be simplified by basing transmission shift points on the equivalent throttle parameter during non-manual fueling control just as transmission shift points are based on throttle percentage during manual fueling conditions.

22 Claims, 5 Drawing Sheets

SYSTEM FOR DETERMINING AN EQUIVALENT THROTTLE VALVE FOR CONTROLLING AUTOMATIC TRANSMISSION SHIFT POINTS

FIELD OF THE INVENTION

The present invention relates generally to systems for processing operating parameters relating to the operation of an internal combustion engine, and more specifically to systems for processing such parameters as they relate to the control of automatic shift points of an electronically controlled automatic transmission coupled to the engine.

BACKGROUND OF THE INVENTION

Modern fully automatic and automated manual transmissions typically include a computer controlled transmission module operable to control and manage the overall operation of the transmission. A communications link, such as an SAE J1939 datalink or other hardwired analog voltage link, is established between the transmission control module and an engine control computer operable to control and manage the overall operation of an internal combustion engine driving the transmission. Certain data relating to the operation of the engine and/or vehicle carrying the engine may thus be broadcast or otherwise transmitted to the transmission module, and certain data relating to the operation of the transmission may likewise be broadcast or otherwise transmitted back to the engine control computer, via the datalink. In this manner, the transmission control module may base operation of the transmission on current engine/vehicle operating conditions.

One of the functions of the transmission control module is to control shift points of the automatically selectable transmission gears. Presently, typical transmission control modules use accelerator pedal position or percentage (often referred to as throttle percentage) during manual fueling conditions (i.e. fueling dominated by manual actuation of the accelerator pedal), as well as other engine operating signals, to control the automatic shift points. During non-manual fueling conditions (i.e., fueling conditions not dominated by manual actuation of the accelerator pedal), such as cruise control operation, power take off (PTO) operation, or other computer-controlled fueling or fuel limiting conditions, the throttle percentage does not produce an accurate indication of requested torque and the transmission controller must accordingly base shift points on some other engine operating parameter being broadcast over the datalink. Typically, transmission controllers respond to non-manual fueling conditions by basing automatic shift points on engine load or a driver requested torque parameter that corresponds to fueling conditions resulting from one or more non-manual fueling control systems.

While the foregoing transmission shift point control logic is widely used, it has certain drawbacks associated therewith. For example, engine load-based shift point control tends to result in excessive shift cycling due to the rapidly changing nature of the engine load parameter. While the driver requested torque parameter tends to produce a more stable shift point control parameter, the automatic shift point logic typically resident within the transmission control module requires unnecessary complexity since it must provide for multiple shift strategies depending upon the fueling mode currently in use.

What is therefore needed is a common parameter on which a transmission control module may base automatic shift point control regardless of the fueling mode currently in use. Such a common parameter would greatly simplify shift point control logic and possibly reduce shift cycling in systems basing non-manual fueling shift point control on engine load. Also, in applications involving computer controlled fuel limiting during manual fueling control, the common parameter should provide a more accurate estimate of throttle percentage than the actual accelerator pedal percentage itself.

SUMMARY OF THE INVENTION

The foregoing shortcomings of the prior art are addressed by the present invention. In accordance with one aspect of the present invention, a system for determining an equivalent throttle value comprises means for determining engine speed of an internal combustion engine and producing an engine speed signal corresponding thereto, an accelerator pedal responsive to manual actuation thereof to produce a first torque request signal, means for producing a second torque request signal, and a control computer producing a fueling command as a function of a dominant one of the first and second torque request signals. The control computer produces an equivalent throttle value as a function of the engine speed signal and the fueling command when the second torque request signal is dominant over the first torque request signal, wherein the equivalent throttle value corresponds to a relative position of the accelerator pedal otherwise required to produce engine operating conditions defined by the engine speed signal and the fueling command.

In accordance with another aspect of the present invention, a method of producing an equivalent throttle value comprises the steps of determining an engine speed value corresponding to engine speed of an internal combustion engine, determining a first torque request corresponding to manual actuation of an accelerator pedal, determining a second torque request corresponding to actuation of a torque requesting device separate from the accelerator pedal, producing a fueling command as a function of a dominant one of the first and second torque requests, and producing an equivalent throttle value as a function of the fueling command and the second torque request when the second torque request is dominant over the first torque request, the equivalent throttle value corresponding substantially to a relative position of the accelerator pedal otherwise required to produce engine operating conditions defined by the engine speed and the fueling command.

One object of the present invention is to provide a system for determining an equivalent throttle value for basing automatic transmission shift points thereon under non-manual throttle control operating conditions.

These and other objects of the present invention will become more apparent from the following description of the preferred embodiment.

DESCRIPTION OF THE PREFERRED EMBODIMENT

Figure 1:
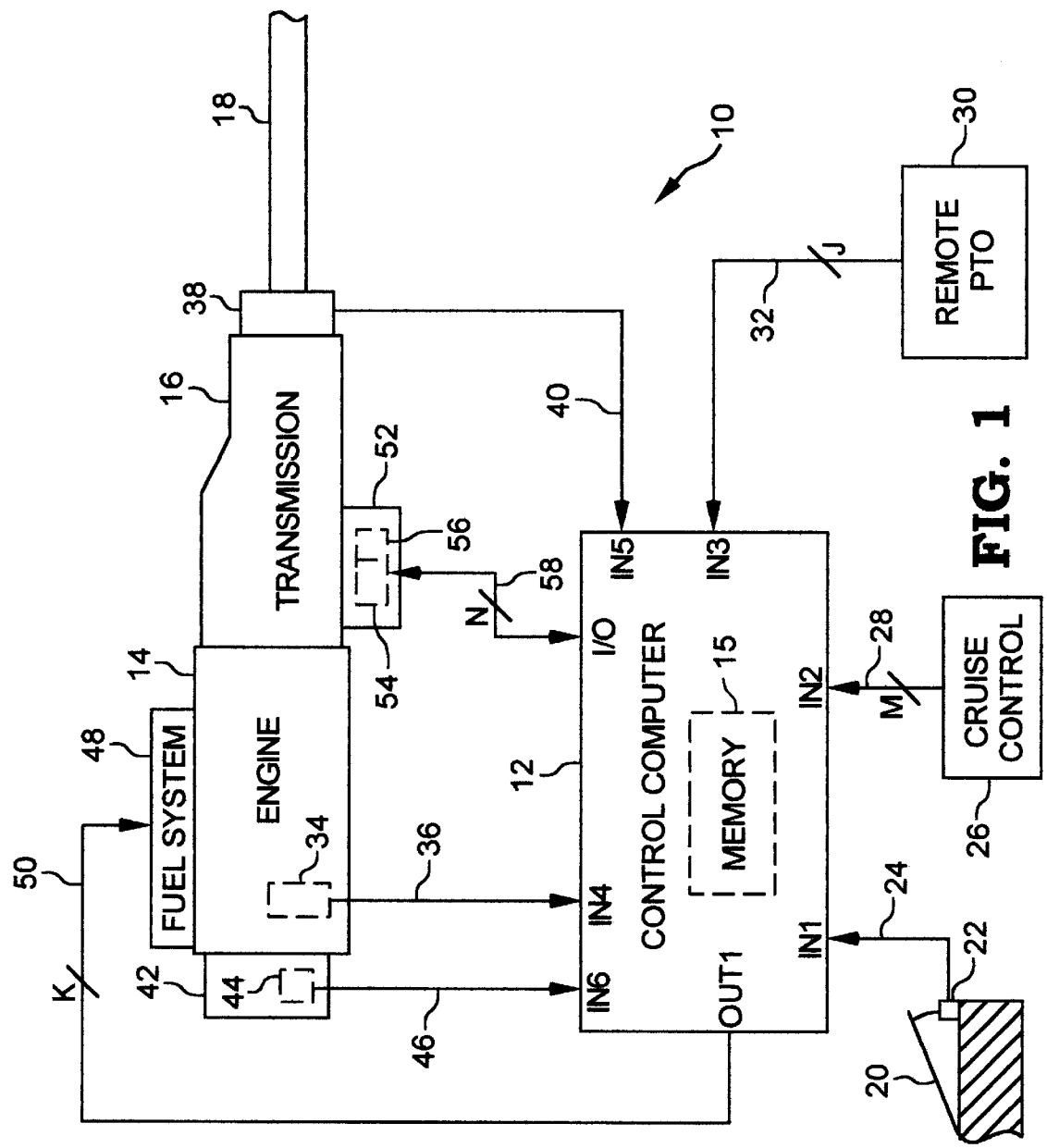
FIG. 1 is a diagrammatic illustration of one embodiment of a system for producing an equivalent throttle parameter, in accordance with the present invention.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Referring to FIG. 1, one embodiment of a system 10 for producing an equivalent throttle parameter, in accordance with the present invention, is shown. Central to system 10 is a control computer 12 including a memory portion 15. In one preferred embodiment, control computer 12 is a known microprocessor-based computer operable to control and manage the overall operation of an internal combustion engine 14, wherein control computer 12 is commonly referred to as an engine control module (ECM), engine control unit (ECU) or the like. It is to be understood, however, that control computer 12 may alternatively be an auxiliary computer operable to produce an equivalent throttle parameter as described below. Internal combustion engine 14 is operatively connected to a transmission 16, which is itself operatively connected to a propeller shaft or tailshaft 18. In operation, engine 14 is operable to drive transmission 16, wherein transmission 16 is operable to drive the vehicle wheels (not shown) via tailshaft 18 and a drive axle (not shown) connected thereto, as is known in the art.

A number of sensors and at least partially electronic subsystems interface with control computer 12, whereby control computer 12 is responsive to signals produced thereby to control the operation of engine 14 as is known in the art. For example, an accelerator pedal 20 is mechanically coupled to a pedal position sensor 22 that is electrically connected to an input IN1 of control computer 12 via signal path 24. In one embodiment, sensor 22 is a potentiometer having a suitable potential established there across and a wiper mechanically coupled to pedal 20 and electrically connected to signal path 24. In operation, the potential between the wiper and one of the ends of the potentiometer provides an accelerator pedal signal on signal path 24 that corresponds to an amount or percentage of deflection of pedal 20. It is to be understood, however, that other known sensors may be used to provide an accelerator pedal signal indicative of accelerator pedal position or pressure applied thereto.

System 10 further includes a known cruise control unit 26 connected to an input port IN2 of control computer 12 via a number M of signal paths, wherein M may be any integer. Cruise control unit 26 typically includes manually actuatable selectors (not shown) for enabling/disabling operation of unit 26 and for selecting known set/coast and accelerate/resume features thereof. Below a specified vehicle speed, cruise control unit 26 further preferably operates in a known power take off (PTO) mode, wherein cruise control unit 26 is operable to maintain a desired engine speed. Additionally, system 10 may include a known remote PTO unit 30 connected to an input port IN3 of control computer 12 via a number J of signal paths 32, wherein J may be any integer. Remote PTO unit 30 may be located at any suitable location with respect to the vehicle carrying engine 14, and preferably includes one or more manually actuatable selectors for controlling PTO operation.

System 10 further includes an engine speed sensor 34 electrically connected to an input IN4 of control computer 12 via signal path 36. Sensor 34 is operable to sense engine rotational speed and provide an engine speed signal corresponding thereto on signal path 36. In one embodiment, sensor 34 is a Hall effect sensor operable to sense passage thereby of a number of teeth of a gear or tone wheel rotating synchronously with the engine crankshaft or camshaft. It is to be understood, however, that sensor 34 may alternatively be any known sensor, such as a variable reluctance sensor or the like, that is operable to sense engine rotational speed and provide an engine speed signal corresponding thereto to input IN4 of control computer 12.

System 10 further includes a vehicle speed sensor 38 electrically connected to an input IN5 of control computer 12 via signal path 40. In the embodiment shown in FIG. 1, vehicle speed sensor 38 is a variable reluctance sensor disposed about propeller shaft 18 adjacent to transmission 16, and is operable to sense rotational speed of shaft 18 and produce a vehicle speed signal on signal path 40 corresponding thereto. It is to be understood, however, that sensor 38 may alternatively be any known sensor suitably located to sense vehicle speed and provide a vehicle speed signal corresponding thereto to input IN5 of control computer 12.

Engine 14 includes a known cooling system 42 having a fluid medium, or coolant, flowing therethrough, wherein the coolant is operable to transfer heat to ambient via a heat exchanger. Cooling system 42 includes a known coolant temperature sensor 44 electrically connected to an input IN6 of control computer 12 via signal path 46. Sensor 44 is operable to sense coolant temperature a provide a corresponding coolant temperature signal to control computer 12 via signal path 46.

Engine 14 further includes a known fueling system 48 electrically connected to an output OUT1 of control computer 12 via a number K of signal paths 50, wherein K may be any integer. In operation, control computer 12 is responsive to at least the engine speed signal on signal path 36, the vehicle speed signal on signal path 40, the coolant temperature signal on signal path 46, and one or more torque request signals to determine fueling commands and produce corresponding fueling signals on signal paths 50. Fuel system 48 is, in turn, responsive to the fueling signals produced by control computer 12 to supply fuel to the engine 14, as is known in the art. The one or more torque request signals may be provided by accelerator pedal sensor 22, cruise control unit 28 or remote PTO unit 30, wherein control computer 12 is typically responsive to only one of these signals at any one time to determine appropriate fueling commands, as is known in the art. Torque requests or torque limiting requests may further be provided by other control systems external to control computer 12 and/or one or more algorithms executable by control computer 12, wherein control computer 12 may be responsive such torque requests or torque limiting requests in addition to a torque request signal produced by sensor 22, unit 28 or unit 30. As one example of a torque limiting request, control computer 12 may be operable to limit engine acceleration rates while torque request signals are being provided by sensor 22, unit 26 or unit 30. One such system for controlling vehicle or engine acceleration rates is described in co-pending U.S. patent application Ser. No. 08/905,990, entitled VEHICLE/ENGINE ACCELERATION RATE MANAGEMENT SYSTEM, which is assigned to the assignee of the present invention, and the contents of which are incorporated herein by reference.

Transmission 16 is known and may be a fully automatic transmission; e.g. a powershift transmission or hydromechanical transmission, having a plurality of automatically selectable gear ratios or an automated manual transmission having a number of manually selectable gear ratios and a number of automatically selectable gear ratios, and in either case transmission 16 will hereinafter be referred to as an automated transmission. Transmission 16 includes an electronic transmission control module 52 having a known transmission control computer 54 and memory unit 56 disposed therein, wherein control computer 54 is operable to control and manage the overall operation of transmission 16 via one or more software algorithms and related information stored within memory unit 56. Transmission control computer is preferably microprocessor-based and includes an input/output port electrically connected in an input/output port I/O of control computer 12 via a number N of signal paths 58, wherein N may be any integer. Signal path 58 is preferably a multi-wire data communications path such as an SAE J1939 datalink, although the present invention contemplates that signal path 60 may alternatively be any other suitable signal path for transmitting information between transmission control computer 54 and control computer 12. Much of the engine/vehicle operational data available to control computer 12 is thus available to computer 54, and transmission operational data available to control computer 54 is likewise available to control computer 12, via datalink 58. In operation, transmission control computer 54 is responsive to operator selection of a transmission operating mode signals as well as certain engine/vehicle operational data broadcast on signal path 58, to control automatic shifting of transmission 16 in accordance with shift point control logic stored within memory 56, as is known in the art.

Control computer 54 may be configured to issue torque requests or torque limiting requests over signal path 58, wherein control computer 12 is responsive to such torque requests or torque limiting requests to alter fueling commands and thereby correspondingly control engine output torque, as is known in the art. Control computer 54 thus provides one example, as discussed hereinabove, of a control system external to control computer 12 for limiting or otherwise requesting engine torque in addition to torque requests provided by accelerator pedal sensor 22, cruise control unit 26 or remote PTO unit 30.

As described in the BACKGROUND section, control computer 12 is typically operable to broadcast a throttle value (e.g. throttle percentage) over signal path 58 when accelerator pedal sensor 22 is providing the dominant torque request signal; i.e. when engine 14 is under manual fuel control. Transmission control computer 54 is, in turn, responsive to the throttle percentage values to control automatic gear shifting in accordance with engine speed shift point logic stored within memory 56. However, when torque requests are dominated by a component or system other than accelerator pedal sensor 22, the throttle percentage value being broadcast over signal path 58 is no longer representative of requested torque and transmission control computer 54 must accordingly base automatic shift points on another broadcast parameter such as engine load or "driver demanded torque" as this term is defined hereinabove. The present invention simplifies this process by producing an "equivalent throttle" parameter whenever a component or system other than accelerator pedal sensor 22 is producing the dominant torque request. Based in part on current fueling commands, the value of the equivalent throttle parameter at any give time corresponds to what the throttle position or percentage would be if sensor 22 was producing the dominant torque request. The automatic shift point control logic within transmission control module 52 may thus be simplified by continuing to base transmission shift points on a throttle percentage value; i.e. equivalent throttle, even when some component or system other than accelerator pedal position sensor 22 is providing the dominant torque request.

Figure 2:
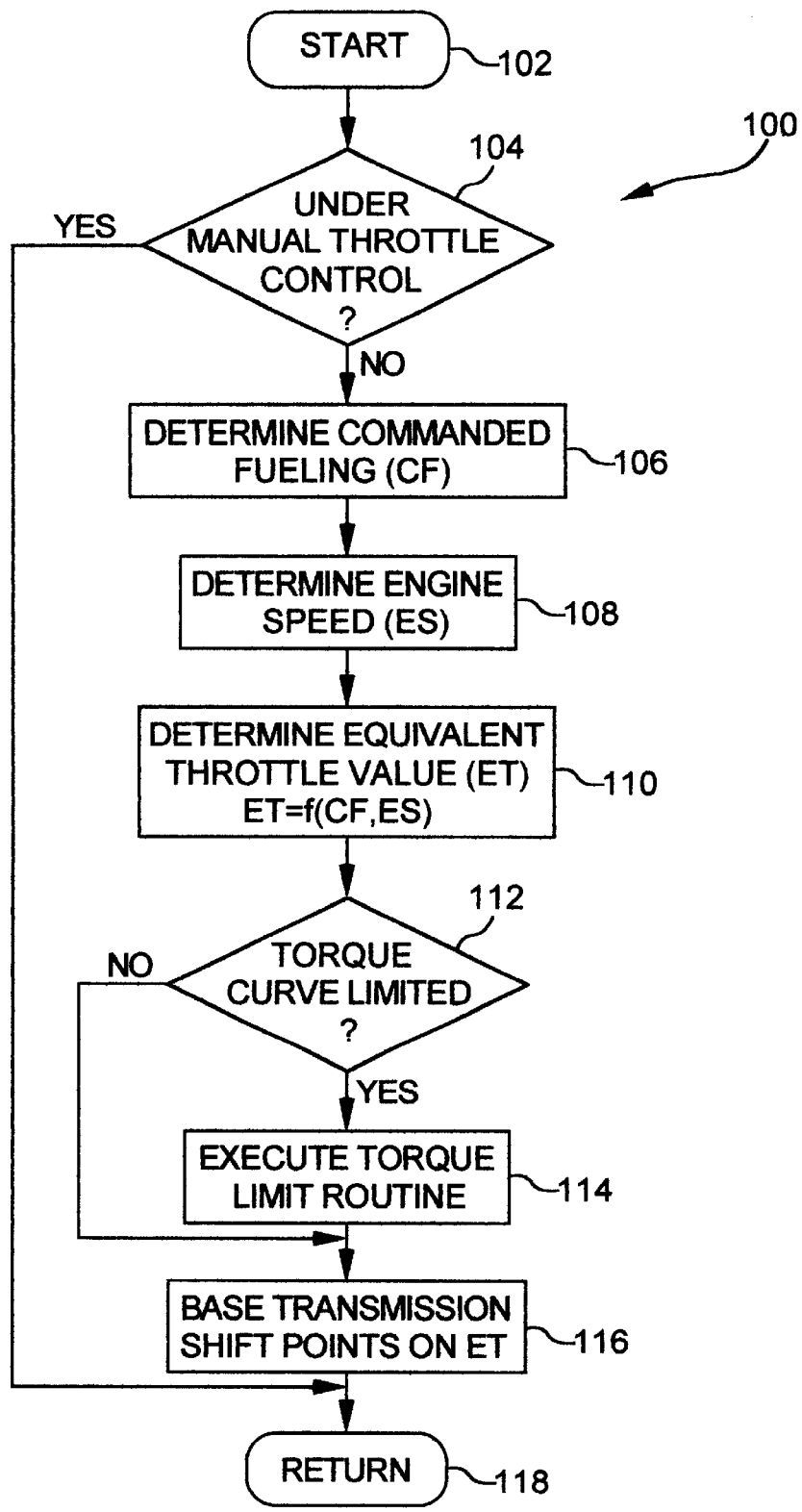
FIG. 2 is a flowchart illustrating one embodiment of a software algorithm, executable by the system of FIG. 1, for producing an equivalent throttle parameter, in accordance with another aspect of the present invention.

Referring now to FIG. 2, a flowchart illustrating one embodiment of a software algorithm 100, for producing an equivalent throttle parameter, in accordance with the present invention, is shown. Preferably, algorithm 100 is executed by control computer 12, wherein control computer 12 is operable to broadcast or otherwise transmit the equivalent throttle parameter value to the transmission control computer 54 via signal path 58. Alternatively, algorithm 100 may be executed by transmission control computer 54, wherein control computer 54 is operable to receive from control computer 12 via signal path 58 any vehicle/engine operating information necessary for determining the equivalent throttle parameter. Once determined, control computer 54 is operable to base automatic transmission shift points, at least in part, on the equivalent throttle parameter value. In either case, algorithm 100 is preferably stored in a suitable memory location (e.g., either memory unit 15 or memory unit 56), and is executable many times per second. With respect to FIGS. 2–5, algorithm 100 will be described as being executed by control computer 12, although it will be understood that algorithm 100 may alternatively be executed by control computer 54 as just described.

Algorithm 100 begins at step 102 and at step 104, control computer 12 is operable to determine whether the dominant torque request is being provided by accelerator pedal sensor 22; i.e., whether the engine is currently under manual throttle control. Preferably, control computer 12 is configured to make this determination by comparing all sources of torque requests and torque limiting requests as is known in the art. However, the particular manner in which control computer 12 makes such a determination does not form part of the present invention, and those skilled in the art will realize other techniques for making this determination, wherein such alternative techniques are intended to fall within the scope of the present invention. In any event, if control computer 12 determines at step 104 that engine 14 is under manual throttle control, algorithm execution continues at step 118 where algorithm 100 is returned to its calling routine. Alternatively, the YES branch of step 104 may loop back to step 104 for continuous operation of algorithm 100.

Under manual throttle control, control computer 12 is operable to broadcast or otherwise transmit accelerator pedal position or percentage (typically referred to as throttle percentage) onto signal path 58, wherein this throttle percentage is indicative of actual fueling conditions. Accordingly, control computer 12 need not determine an equivalent throttle value since transmission control computer 54 is already operable to base automatic transmission shift points, at least in part, on throttle percentage during manual fueling conditions. However, the present invention contemplates that algorithm 100 may be altered to set the equivalent throttle parameter value to the actual throttle percentage value under manual fueling conditions, wherein the equivalent throttle parameter value will, in this case, be equal to the actual percentage or position of accelerator pedal 20. Such an alteration in algorithm 100 will allow transmission control computer 54 to always base automatic transmission shift points, at least in part, on the equivalent throttle parameter value rather than on the throttle percentage variable when under manual throttle control and on the equivalent throttle parameter value when not under manual throttle control.

Returning to algorithm 100, if control computer 12 determines at step 104 that engine 14 is not currently under manual throttle control, then some other component or subsystem is currently controlling or dominating torque requests and algorithm execution continues at step 106 where control computer 12 is operable to determine a current commanded fueling value (CF). Since control computer 12 is operable to determine fueling commands as described hereinabove, step 106 preferably consists of no more that retrieving the current commanded fueling value CF from within control computer 12. If, however, control computer 54 is executing algorithm 100, step 106 consists of determining CF from one or more messages broadcast or otherwise transmitted onto signal path 58 by control computer 12, such as engine load percentage and/or the like.

As it relates to the present invention, commanded fueling values are determined at step 106 as an estimate of current engine output torque conditions. Thus, as an alternative to commanded fueling values, system 10 may include known means for sensing or otherwise determining actual current engine output torque conditions and substituting this value for CF within algorithm 100. Doing so provides for more accurate estimates of equivalent throttle parameter values, but typically adds cost and complexity to system 10. Those skilled in the art will recognize other techniques for estimating or determining actual engine output torque conditions for use in algorithm 100, and such alternate techniques are intended to fall within the scope of the present invention.

Algorithm execution continues from step 106 at step 108 where control computer 12 is operable to determine a current engine speed value (ES), preferably by monitoring signal path 36. If control computer 54 is executing algorithm 100, control computer 12 is preferably operable to broadcast or otherwise transmit ES over signal path 58. In any case, algorithm 100 continues from step 108 at step 110 where control computer 12 is operable to determine an equivalent throttle parameter value (ET) as a function of at least engine output torque (in the form of currently commanded fueling conditions CF) and engine speed ES. In one embodiment, memory unit 15 of control computer 12 includes a mapping structure for mapping CF and ES to an equivalent throttle value ET. The mapping structure may be any known structure such as a look up table, graph, equation or the like. In one particular embodiment, the mapping structure is a 3-dimensional look up table that maps current CF and ES values to an appropriate ET value, wherein a separate such look up table is provided for each desired governor droop value. Alternatively, control computer 12 is operable to determine the equivalent throttle parameter value ET at step 110 via a tracking estimator control loop. One particular embodiment of a software version of such a control loop for accomplishing steps 106–110 of algorithm 100 is illustrated in FIG. 3 as forming part of control computer 12.

Figure 3:
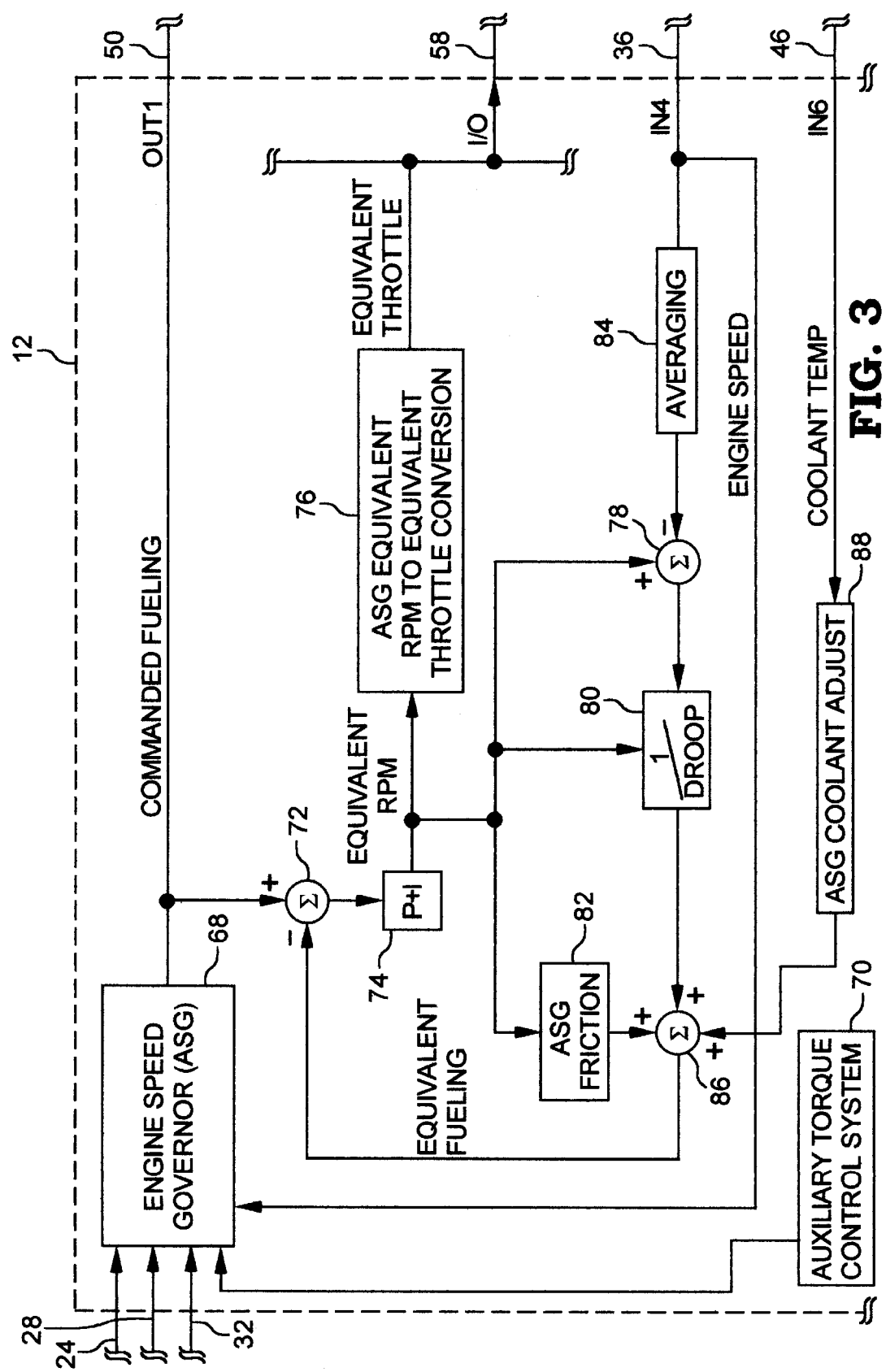
FIG. 3 is a block diagram of a portion of the control computer shown in FIG. 1, illustrating one embodiment of a software control technique for producing an equivalent throttle value, in accordance with yet another aspect of the present invention.

Referring now to FIG. 3, it is to be understood that the internal features of control computer 12 are intended to illustrate functionality of control computer 12, and are not necessarily intended to represent physical structures within control computer 12. Control computer 12 includes a known engine speed governor 68 which, in the embodiment illustrated in FIG. 3, is a known all-speed governor (ASG). It is to be understood, however, that governor 68 may alternatively be any known engine speed governor, and that adapting the control loop illustrated in FIG. 3 to any such alternate governor would be a mechanical step for a skilled artisan. In any case, torque request signals provided by signal paths 24, 28 and 32 (FIG. 1), as well as any auxiliary torque control system 70 included within control computer 12 as described hereinabove, are connected to governor 68. Signal path 36 is also connected to governor 68, wherein governor 68 is responsive to at least one or more of the torque request and/or torque limit request signals and the engine speed signal to produce fueling commands and provide fueling signals corresponding thereto to fuel system 48 via signal path 50.

The commanded fueling value (CF) is further provided to a non-inverting input of a summing node 72, wherein summing node 72 also includes an inverting input receiving an equivalent fueling value from an output of another summing node 86. An output of summing node 72 is connected to a proportional/integral block 74 operable to convert the error between the commanded fueling value and the equivalent fueling value to an equivalent engine (speed) RPM value. The equivalent RPM value is provided to an input of an equivalent RPM to equivalent throttle conversion block 76, a non-inverting input of a summing node 76, an input of a droop ratioing block 80 and an input of a friction block 82. Friction block 82 is a "feedforward" portion of the control loop and is preferably a lookup table or equivalent structure for converting equivalent RPM to a fueling value. Droop ratioing block 80 divides the combined input of the equivalent RPM value and an engine speed error value provided thereto by an output of summing node 78 by a droop value, wherein the droop value is preferably a desired governor droop slope in units of RPM drop per $mm^3$/strk (fuel units). Block 80 thus produces an output in units of fueling.

The engine speed signal on signal path 36 is routed to an averaging block 84 operable to compute a running average of engine speed over some time interval, wherein the resulting average engine speed is provided to an inverting input of summing node 84. The output of summing node 78 is thus the difference, or error, between the equivalent RPM value and the average engine speed (RPM) value.

Although not shown in the flowchart of FIG. 2, the control loop of FIG. 3 may further include a coolant temperature adjust block 88 operable to receive the coolant temperature signal from signal path 46 and convert the coolant temperature to a fueling adjustment signal. Coolant adjust block may optionally be included to provide for enhanced governor operation during cold starting conditions as is known in the art. The output of block 88 is connected to a non-inverting input of summing node 86, wherein summing node 86 further includes a second non-inverting input connected to an output of droop ratioing block 80 and a third non-inverting input connected to an output of friction block 82. Summing node 86 is thus operable to sum a feedforward representation of the equivalent RPM value, a droop-ratioed error between equivalent RPM and average RPM and a coolant temperature adjustment factor, and provide an equivalent fueling value as an output thereof.

Block 76 is operable to produce the equivalent throttle parameter value which corresponds to a percentage of accelerator pedal 20 that is required to match current engine output torque (estimated via present fueling conditions) and engine speed conditions of engine speed governor 68. In the embodiment illustrated in FIG. 3, governor 68 is an all-speed governor and so the control loop just described is preferably optimized to provide an equivalent throttle value that most closely matches the current engine output torque (estimated) and engine speed conditions of all speed governor 68. As indicated above, the present invention contemplates that governor 68 may configured to govern engine speed in accordance with other known speed governing techniques, and modification of the control loop illustrated in FIG. 3 to accommodate another type of governor would be a mechanical step to a person of ordinary skill in the art. In any case, the output of block 76 is connected to input/output port I/O of control computer 12 so that control computer 12 may broadcast or otherwise transmit the equivalent throttle value onto signal path 58.

Returning again to algorithm 100 of FIG. 2, step 110 continues at step 112 where control computer 12 determines whether engine output torque is currently limited by a maximum allowable engine output torque, typically defined within control computer 12 as a predefined torque curve. In the embodiment of system 10 illustrated in FIG. 1, control computer 12 is operable to make such a determination by monitoring fueling commands, estimating engine output torque therefrom and comparing the estimated output torque to the predefined torque curve or other engine output torque defining mechanism implemented by control computer 12. However, the present invention contemplates providing known means for determining actual engine output torque and comparing the actual engine output torque to the predefined torque curve or other engine output torque defining mechanism. If, at step 112, engine output torque is not limited by the predefined engine output torque curve, algorithm execution continues at step 116. If, however, engine output torque is limited by the predefined torque curve algorithm execution continues at step 114 where control computer 12 executes a torque limit routine.

Figure 4:
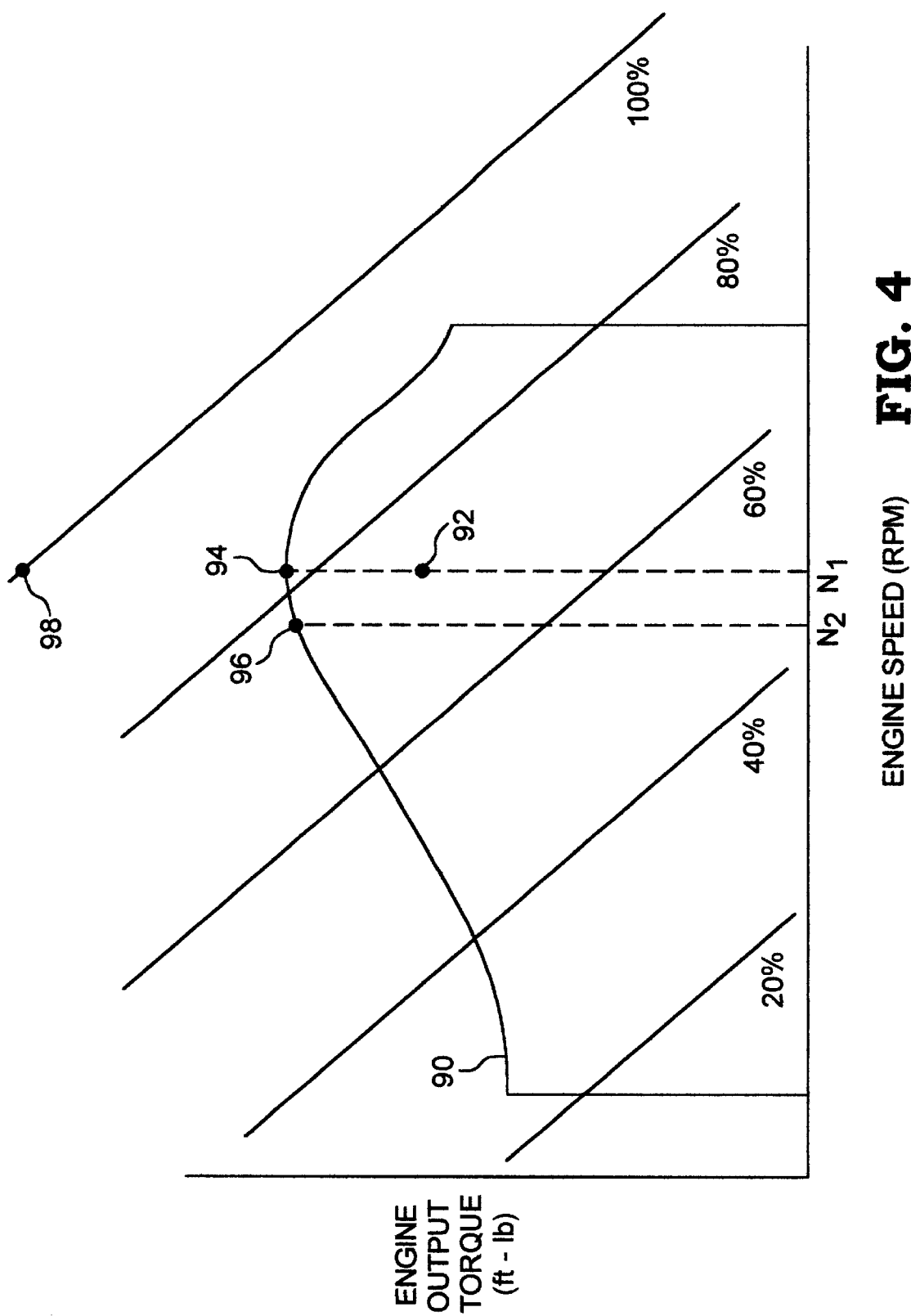
FIG. 4 is a plot of engine output torque vs. engine speed illustrating an effect of torque curve limiting of engine output torque.

Referring now to FIG. 4, an example of a predefined engine output torque curve 90 vs. engine speed is illustrated, wherein actual throttle percentage lines (corresponding to accelerator pedal percentage values provided by accelerator pedal position sensor 22) having a common arbitrary droop value are superimposed over the torque curve 90. With the aid of curve 90, a purpose of steps 114 and 116 of algorithm 100 will now be explained.

Point 92 illustrates a typical engine operating condition at an engine speed N, wherein engine output torque is not limited by the upper boundary of torque curve 90. In this case, control computer 12 is operable (via steps 106–110 of algorithm 100) to correctly estimate an equivalent throttle value of between 60% and 80% as indicated graphically. If engine speed remains constant at $N_1$ while engine load rises, engine output torque will reach the point 94 wherein engine output torque is limited by the upper boundary of the torque curve 90. If engine load does not change, algorithm 100 will correctly estimate the equivalent throttle value at slightly higher than 80% as indicated graphically in FIG. 4. If, however, engine load continues to increase with engine output torque limited by the upper boundary of the torque curve 90, the engine speed operating point 94 will drift left, for example to point 96, because engine load has increased with no corresponding increase in engine output torque. As a result, engine speed at point 96 drops to $N_2$ ($<N_1$), and the engine speed governor 68 of FIG. 3 will attempt to maintain the desired engine speed $N_1$ by commanding additional fuel. The additional fuel commanded by governor 68 may correspond to a throttle percentage of 100% so that the engine speed operating point is effectively at point 98. Due to the upper boundary of the torque curve 90, however, algorithm 100 will (at steps 106–110) incorrectly determine the equivalent throttle value to be slightly less than 80%, which corresponds to the engine speed operating point 96. One goal of a torque limiting routine indicated at step 114 is thus to model the actual response of engine speed governor 68 according to the above scenario by increasing the value of the equivalent throttle parameter whenever engine speed (or vehicle speed) has dropped while engine output torque is limited by the upper boundary of the torque curve 90.

Figure 5:
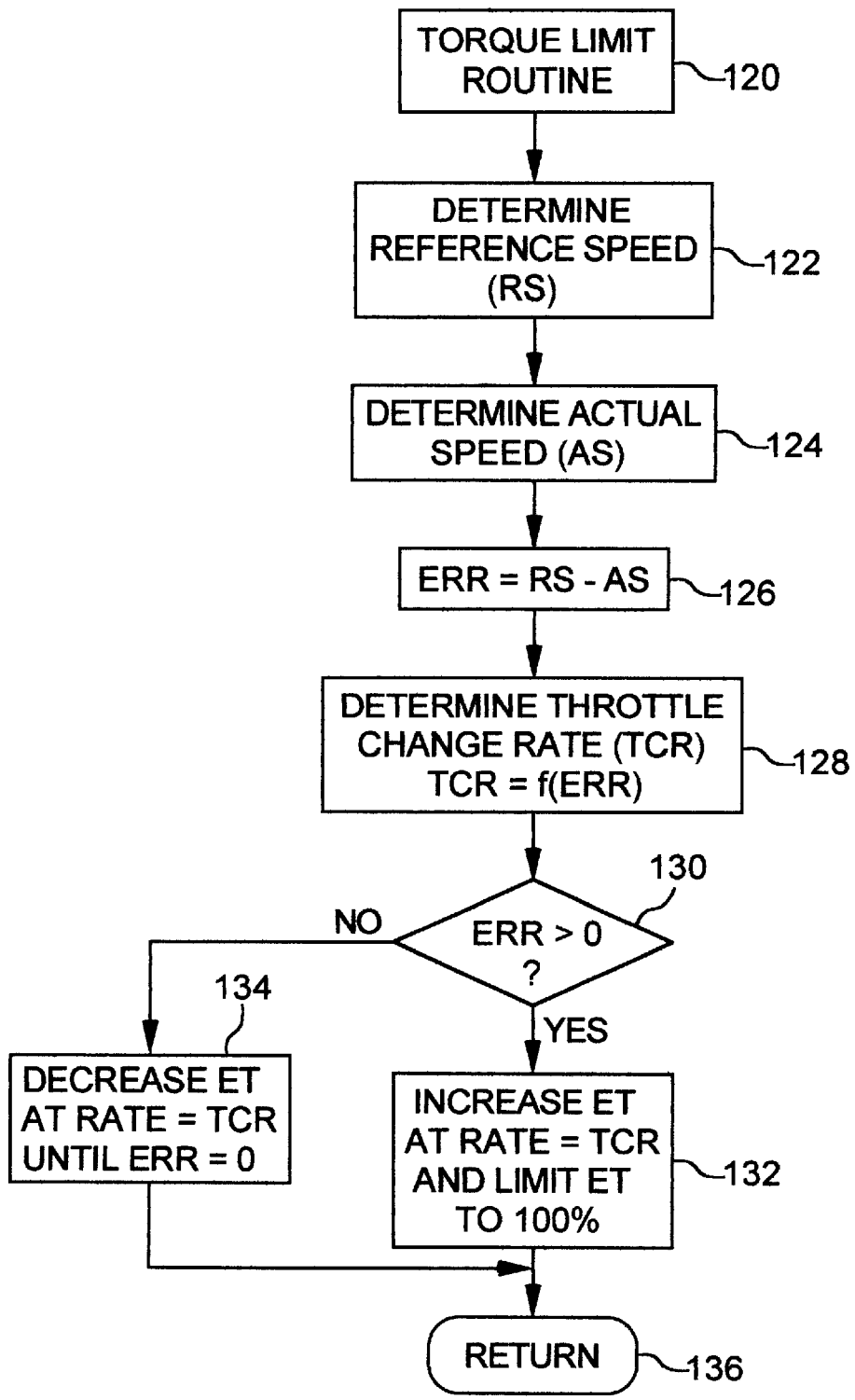
FIG. 5 is a flowchart illustrating one embodiment of a software algorithm, executable by the system of FIG. 1, for addressing the torque limiting effect of FIG. 4 in producing the equivalent throttle value of the present invention.

Referring now to FIG. 5, a flowchart illustrating one embodiment of a torque limit routine 120 called for at step 114 of FIG. 2 is shown. Routine 120 is called by algorithm 100 because control computer 12 has detected at step 112 that engine output torque is being limited by the engine output torque curve. Routine 120 begins at step 122 where control computer 12 is operable to determine a reference speed value (RS). If engine torque is being requested by power-take-off (PTO) unit 30, the reference speed value RS is preferably a reference engine speed requested by PTO unit 30. If, on the other hand, engine torque is being requested by cruise control unit 26, the reference speed value RS is preferably a vehicle speed requested by cruise control unit 26. Thereafter at step 124, control computer 12 is operable to determine an actual speed value AS. If engine torque is being requested by PTO unit 30, control computer 12 is preferably operable at step 124 to determine current engine speed, preferably via engine speed sensor 34, wherein AS is the current engine speed value. If, on the other hand, engine torque is being requested by cruise control unit 26, control computer 12 is preferably operable at step 124 to determine current vehicle speed, preferably via vehicle speed sensor 38, wherein AS is the current vehicle speed value. Thereafter at step 126, control computer 12 is operable to compute a speed error ERR as a function of RS and AS. In one embodiment, control computer 12 is operable at step 126 to determine ERR as a difference between RS and AS, although the present invention contemplates determining ERR in accordance with other mathematical functions.

In any case, algorithm execution continues from step 126 at step 128 where control computer 12 is operable to determine a throttle change rate TCR as a function of the speed error ERR. In one embodiment TCR is preferably proportional to the magnitude of the absolute value of ERR such that the throttle change rate TCR is greater for larger ERR values and lesser for smaller ERR values, although the present invention contemplates determining TCR according to other mathematical functions. In any event, algorithm execution continues from step 128 at step 130 where control computer 12 is operable to compare ERR to a threshold value; i.e. zero. If ERR is greater than zero at step 130, algorithm execution continues at step 132 where control computer 12 is operable to increase the effective throttle value ET at a rate equal to TCR, but not to exceed 100%. If, on the other hand, ERR is less than or equal to zero at step 130, algorithm execution continues at step 134 where control computer 12 is operable to decrease the effective throttle value ET at a rate equal to TCR until ERR is zero. Algorithm execution continues from steps 132 and 134 at step 136 where the throttle limit routine is returned to step 114 of algorithm 100.

Returning to FIG. 2, algorithm execution continues from step 114 at step 116 where control computer is operable to broadcast or otherwise transmit the equivalent throttle value to control computer 54 via signal path 58, and wherein control computer 54 is operable to base automatic transmission shift points, at leas in part, on the equivalent throttle parameter. Thereafter at step 118, execution of algorithm 100 is returned to its calling routine. Alternatively, algorithm 100 may loop from step 116 back to step 104 for continuous operation of algorithm 100.

From the foregoing it should be evident that the present invention overcomes the deficiencies in the known automatic transmission shift point control systems by continuously computing an equivalent throttle percentage whenever fueling or requested torque values are not dominated by accelerator pedal percentage. The equivalent throttle parameter value is approximately what the throttle percentage would be if the accelerator pedal percentage was the dominant source of requested torque. Transmission shift point logic may resultantly be simplified by basing transmission shift points on the equivalent throttle parameter during non-manual fueling control just as transmission shift points are based on throttle percentage during manual fueling conditions.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. System for determining an equivalent throttle value, comprising:

means for determining engine speed of an internal combustion engine and producing an engine speed signal corresponding thereto;

an accelerator pedal responsive to manual actuation thereof to produce a first torque request signal;

means for producing a second torque request signal; and a control computer producing a fueling command as a function of a dominant one of said first and second torque request signals, said control computer producing an equivalent throttle value as a function of said engine speed signal and said fueling command when said second torque request signal is dominant over said first torque request signal, said equivalent throttle value corresponding to a relative position of said accelerator pedal otherwise required to produce engine operating conditions defined by said engine speed signal and said fueling command.

2. The system of claim 1 wherein said control computer is operable to produce a real throttle value corresponding to a relative position of said accelerator pedal when said first torque request signal is dominant over said second torque request signal.

3. The system of claim 1 wherein said means for producing a second torque request includes a power-take-off (PTO) unit.

4. The system of claim 1 wherein said means for producing a second torque request includes a cruise control unit.

5. The system of claim 1 further including:

a transmission operatively connected to said engine, said transmission having a number of automatically selectable gear ratios; and a transmission control computer associated with said transmission, said transmission control computer responsive to said equivalent throttle value to control engine speed shift points of said number of automatically selectable gear ratios as a function thereof when said second torque request signal is dominant over said first torque request signal.

6. The system of claim 5 wherein said control computer is an engine control computer operable to control operation of said engine.

7. The system of claim 1 further including a transmission operatively connected to said engine, said transmission having a number of automatically selectable gear ratios;

and wherein said control computer is a transmission control computer associated with said transmission, said transmission control computer controlling engine speed shift points of said number of automatically selectable gear ratios as a function of said equivalent throttle value when said second torque request signal is dominant over said first torque request signal.

8. The system of claim 1 wherein said control computer includes a memory having stored therein a look-up table of equivalent throttle values, said control computer operable to produce said equivalent throttle value by mapping said fueling command and said engine speed signal to an appropriate one of said equivalent throttle values stored in said memory.

9. The system of claim 1 wherein said control computer includes a tracking estimator control loop having as inputs said engine speed signal and said fueling command, said tracking estimator control loop determining said equivalent throttle value based on said fueling command and said engine speed signal.

10. The system of claim 9 wherein said tracking estimator control loop includes:

means responsive to said engine speed signal for computing an average engine speed value;

means responsive to a first error value corresponding to a difference between said fueling command and an equivalent fueling value for computing an equivalent engine speed value;

means responsive to a second error value corresponding to a difference between said equivalent engine speed value and said average speed value for computing a first fueling value as a function of a throttle droop value;

means responsive to said equivalent engine speed value for computing a second fueling value as a function thereof;

means for computing said equivalent fueling value as a function of said first and second fueling values; and means responsive to said equivalent engine speed value for computing said equivalent throttle value.

11. The system of claim 10 wherein said system further includes a cooling system associated with said engine, said cooling system having a coolant medium therein and a coolant sensor operable to determine a temperature of said coolant medium and produce a coolant temperature signal corresponding thereto;

and wherein said tracking estimator control loop further includes means responsive to said coolant temperature signal for computing a third fueling value as a function thereof;

and wherein said means for computing said equivalent fueling value as a function of said first and second fueling values further includes means for computing said equivalent fueling value as a function of said first, second and third fueling values.

12. The system of claim 1 further including a data bus connected to said control computer;

and wherein said control computer is operable to broadcast said equivalent throttle value over said data bus.

13. The system of claim 12 wherein said serial data bus is a SAE J1939 data bus.

14. The system of claim 1 further including a fuel system responsive to said fueling command to supply fuel to said engine.

15. The system of claim 3 wherein said control computer is operable to increase said effective throttle value as a function of said engine speed signal and a reference speed of said PTO unit if said fueling command indicates that output torque of said engine is limited by a maximum engine torque value at a present engine speed indicated by said engine speed signal and said reference speed of said PTO unit is greater than said present engine speed.

16. The system of claim 15 wherein said control computer is operable to determine a speed error as a difference between said reference speed of said PTO unit and said present engine speed and further determine a rate of change of said effective throttle value as a function of said speed error if said speed error greater than zero.

17. The system of claim 15 wherein said control computer is operable to decrease said effective throttle value at said rate of change of said effective throttle value until said speed error is substantially eliminated if said speed error is less than zero.

18. The system of claim 4 further including means for determining vehicle speed and producing a vehicle speed signal corresponding thereto;

and wherein said control computer is operable to increase said effective throttle value as a function of said vehicle speed signal and a reference speed of said cruise control unit if said fueling command indicates that output torque of said engine is limited by a maximum engine torque value at a present engine speed indicated by said engine speed signal and said reference speed of said cruise control unit is greater than a present vehicle speed indicated by said vehicle speed signal.

19. The system of claim 18 wherein said control computer is operable to determine a speed error as a difference between said reference speed of said cruise control unit and said present vehicle speed and further determine a rate of change of said effective throttle value as a function of said speed error if said speed error greater than zero.

20. The system of claim 19 wherein said control computer is operable to decrease said effective throttle value at said rate of change of said effective throttle value until said speed error is substantially eliminated if said speed error is less than zero.

21. A method of producing an equivalent throttle value, comprising the steps of:

determining an engine speed value corresponding to engine speed of an internal combustion engine;

determining a first torque request corresponding to manual actuation of an accelerator pedal;

determining a second torque request corresponding to actuation of a torque requesting device separate from said accelerator pedal;

producing a fueling command as a function of a dominant one of said first and second torque requests; and producing an equivalent throttle value as a function of said fueling command and said second torque request when said second torque request is dominant over said first torque request, said equivalent throttle value corresponding substantially to a relative position of said accelerator pedal otherwise required to produce engine operating conditions defined by said engine speed and said fueling command.

22. The method of claim 16 further including the step of basing engine speed shift points of a transmission coupled to said engine on said equivalent throttle value when said second fueling request is dominant over said first fueling request.

* * * * *